United States Patent
Takahashi et al.

(10) Patent No.: US 10,524,242 B2
(45) Date of Patent: Dec. 31, 2019

(54) USER EQUIPMENT AND UPLINK DATA TRANSMISSION METHOD

(71) Applicant: NTT DOCOMO, INC., Tokyo (JP)

(72) Inventors: Hideaki Takahashi, Tokyo (JP); Tooru Uchino, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/125,381

(22) PCT Filed: Feb. 26, 2015

(86) PCT No.: PCT/JP2015/055564
§ 371 (c)(1),
(2) Date: Sep. 12, 2016

(87) PCT Pub. No.: WO2015/141425
PCT Pub. Date: Sep. 24, 2015

(65) Prior Publication Data
US 2017/0079015 A1  Mar. 16, 2017

(30) Foreign Application Priority Data
Mar. 18, 2014 (JP) .................. 2014-055169

(51) Int. Cl.
*H04W 28/14* (2009.01)
*H04W 72/04* (2009.01)
(Continued)

(52) U.S. Cl.
CPC .......... *H04W 72/042* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS

| 9,629,025 | B2* | 4/2017 | Gao ...................... H04W 28/08 |
| 2011/0242972 | A1 | 10/2011 | Sebire et al. |
| 2012/0142354 | A1* | 6/2012 | Ahluwalia ........ H04W 36/0072 455/436 |

OTHER PUBLICATIONS

European Search Report issued in corresponding European Application No. 15765750.3, dated Feb. 22, 2017 (11 pages).

(Continued)

*Primary Examiner* — Angel T Brockman
(74) *Attorney, Agent, or Firm* — Osha Liang LLP

(57) ABSTRACT

User equipment having a dual connectivity function to communicate with multiple base stations simultaneously includes a transmission buffer configured to store uplink data for transmission, a buffer status management unit configured to manage a data amount stored in the transmission buffer, and a transmission control unit configured to receive splitting trigger information indicative of a threshold for the data amount stored in the transmission buffer and a first base station to transmit the uplink data stored in the transmission buffer when the stored data amount is smaller than or equal to the threshold and select a base station to transmit the uplink data stored in the transmission buffer from the multiple base stations depending on whether the data amount stored in the transmission buffer is smaller than or equal to the threshold.

14 Claims, 7 Drawing Sheets

(51) Int. Cl.

| | | |
|---|---|---|
| *H04W 76/15* | (2018.01) | |
| *H04L 12/835* | (2013.01) | |
| *H04L 5/00* | (2006.01) | |
| *H04W 28/08* | (2009.01) | |
| *H04W 28/02* | (2009.01) | |
| *H04W 72/12* | (2009.01) | |

(52) U.S. Cl.
CPC ............ *H04L 5/0058* (2013.01); *H04L 47/30* (2013.01); *H04W 28/0236* (2013.01); *H04W 28/0278* (2013.01); *H04W 28/08* (2013.01); *H04W 28/14* (2013.01); *H04W 72/0413* (2013.01); *H04W 76/15* (2018.02); *H04L 5/0044* (2013.01); *H04W 72/1284* (2013.01)

(56) References Cited

OTHER PUBLICATIONS

Ericsson; "BSR and LCP procedures for split bearers"; 3GPP TSG-RAN WG2 #85, Tdoc R2-140656; Prague, Czech Republic; Feb. 10-14, 2014 (4 pages).

Huawei, HiSilicon; "BSR for small cell enhancement"; 3GPP TSG-RAN WG2 Meeting #85, R2-140058; Prague, Czech Republic; Feb. 10-14, 2014 (4 pages).

International Search Report issued in PCT/JP2015/055564, dated Apr. 28, 2015 (1 page).

Written Opinion of the International Searching Authority issued in PCT/JP2015/055564, dated Apr. 28, 2015 (4 pages).

Panasonic; "BSR Reporting Options for Dual Connectivity"; 3GPP TSG RAN WG2 #85, R2-140475; Prague, Czech Republic; Feb. 10-14, 2014 (3 pages).

3GPP TS 36.321 V12.0.0; "3rd Generation Partnership Project; Technical Specification Group Radio Access Network; Evolved Universal Terrestrial Radio Access (E-UTRA); Medium Access Control (MAC) protocol specification (Release 12)"; Dec. 2013 (57 pages).

3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)"; Dec. 2013 (70 pages).

3GPP TS 36.300 V12.0.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 12)"; Dec. 2013 (208 pages).

3GPP TS 36.331 V12.0.0; "3rd Generation Partnership Project; Technical Specification Group Radio Access Network; Evolved Universal Terrestrial Radio Access (E-UTRA); Radio Resource Control (RRC); Protocol specification (Release 12)"; Dec. 2013 (349 pages).

3GPP TS 36.323 V11.2.0; "3rd Generation Partnership Project; Technical Specification Group Radio Access Network; Evolved Universal Terrestrial Radio Access (E-UTRA); Packet Data Convergence Protocol (PDCP) specification (Release 11)"; Mar. 2013 (27 pages).

Office Action issued in corresponding Japanese Application No. 2014-055169, dated Jan. 4, 2017 (6 pages).

Office Action issued in corresponding European Application No. 15765750.3, dated Oct. 17, 2017 (8 pages).

Office Action issued in the counterpart Chilean Patent Application No. 2016002297, dated Jan. 23, 2018 (11 pages).

Office Action issued in the counterpart European Patent Application No. 15765750.3, dated Aug. 27, 2018 (7 Pages).

Office Action issued in corresponding Japanese Application No. 2017-099686, dated Jun. 12, 2018 (5 pages).

Office Action issued in corresponding European Application No. 15765750.3, dated Apr. 13, 2018 (6 pages).

\* cited by examiner

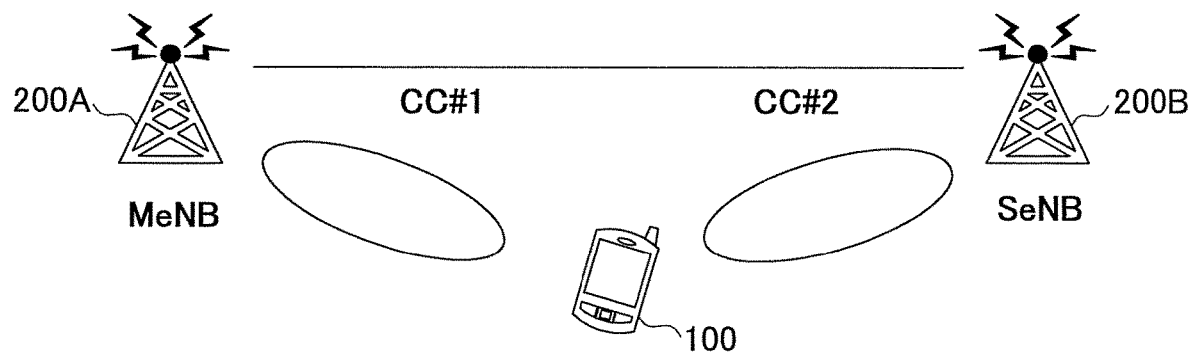

FIG.7

| Index | Buffer Size (BS) value [bytes] | Index | Buffer Size (BS) value [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <= 4940 | 63 | BS > 3000000 |

USER EQUIPMENT AND UPLINK DATA TRANSMISSION METHOD

TECHNICAL FIELD

The present invention relates to a radio communication system.

BACKGROUND ART

Presently, as next-generation communication standards of LTE (Long Term. Evolution), 3GPP (3$^{rd}$ Generation Partnership Project) is developing specifications designed to sophisticate LTE-Advanced. In LTE-Advanced systems, carrier aggregation (CA) technique is introduced to achieve a higher throughput than that of LTE systems while ensuring backward compatibility with the LTE systems. In the carrier aggregation, a component carrier (CC) having the maximum bandwidth of 20 MHz supported by the LTE systems is used as a basic component, and it is designed to achieve communication in a broader band by using these multiple component carriers simultaneously.

In the carrier aggregation, user equipment (UE) can use multiple component carriers simultaneously to communicate with a base station (evolved NodeB: eNB). In the carrier aggregation, a highly reliable primary cell (PCell) to ensure connectivity to the user equipment and a secondary cell (SCell) additionally configured for the user equipment in connection with the primary cell are configured.

The primary cell is similar to a serving cell in the LTE systems and serves as a cell to ensure connectivity between the user equipment and a network. On the other hand, the secondary cell is a cell configured for the user equipment additionally to the primary cell. Addition and deletion of the secondary cell are performed with an RRC (Radio Resource Control) configuration.

In the carrier aggregation up to LTE Release 10 (Rel-10), as illustrated in the left side in FIG. 1, it is defined that user equipment uses multiple component carriers served from a single base station to conduct simultaneous communication. Meanwhile, in Rel-12, the carrier aggregation in Rel-10 is further extended, and as illustrated in the right side in FIG. 1, dual connectivity where the user equipment uses multiple component carriers served from multiple base stations to conduct the simultaneous communication is discussed. For example, if all component carriers cannot be accommodated in a single base station, it is considered that the dual connectivity can be effectively utilized to achieve a throughput nearly equal to that in Rel-10.

In the dual connectivity, as illustrated in FIG. 2, bearer splitting where user equipment (UE) splits a single EPS (Evolved Packet System) bearer or packet sequence in a predefined manner and uses component carriers served from multiple base stations (eNB#1, eNB#2) to transmit the respective split packet sequences simultaneously is discussed. Specifically, as illustrated, the user equipment splits the to-be-transmitted EPS bearer into packet sequences destined for eNB#1 and eNB#2 in a certain ratio (eNB#1: eNB#2=4:3 in the illustrated example) and transmits the respective split packet sequences to the base stations eNB#1 and eNB#2 via component carriers CC#1 and CC#2, respectively. Upon receiving the split packet sequence via CC#2, the base station eNB#2 serving as a non-anchor node forwards the received packet sequence to the anchor base station eNB#1. Upon receiving the packet sequence forwarded from eNB#2, eNB#1 reorders the packet sequence received via CC#1 and the packet sequence received from eNB#2 to reconstruct the packet sequence from the user equipment and forwards the reconstructed packet sequence to a core node (CN).

See 3GPP TR36.842 "Study on Small Cell enhancements for E-UTRA and E-UTRAN; Higher Layer aspects" for detail, for example.

SUMMARY OF INVENTION

For a packet distribution manner to implement the bearer splitting of uplink data, a method for setting a ratio for distributing data amounts of the uplink data over respective component carriers or component groups (CGs) (eNB#1: eNB#2=4:3 in the example in FIG. 2) in a semi-static manner has been proposed.

However, if the data amount ratio is not properly set in accordance with the proposed semi-static data amount ratio setting method, there is a likelihood that an uplink throughput cannot be improved. For example, if a throughput sufficient to transmit distributed data cannot be implemented in a certain cell due to degraded communication quality, the data distributed to the cell would be accumulated in a transmission buffer for storing to-be-transmitted uplink data.

One or more embodiments of the present invention provide techniques for transmitting uplink data in the dual connectivity efficiently.

One aspect of the present invention relates to user equipment having a dual connectivity function to communicate with multiple base stations simultaneously, comprising: a transmission buffer configured to store uplink data for transmission; a buffer status management unit configured to manage a data amount stored in the transmission buffer; and a transmission control unit configured to receive splitting trigger information indicative of a threshold for the data amount stored in the transmission buffer and a first base station to transmit the uplink data stored in the transmission buffer when the stored data amount is smaller than or equal to the threshold and select a base station to transmit the uplink data stored in the transmission buffer from the multiple base stations depending on whether the data amount stored in the transmission buffer is smaller than or equal to the threshold.

Another aspect of the present invention relates to an uplink data transmission method for use in user equipment having a dual connectivity function to communicate with multiple base stations simultaneously, the method comprising: receiving splitting trigger information indicative of a threshold for a data amount stored in a transmission buffer for storing uplink data for transmission and a first base station to transmit the uplink data stored in the transmission buffer when the stored data amount is smaller than or equal to the threshold; determining whether the data amount stored in the transmission buffer is smaller than or equal to the threshold; selecting a base station to transmit the uplink data stored in the transmission buffer from the multiple base stations depending on a result of the determination; and transmitting the uplink data to the selected base station.

According to one or more embodiments of the present invention, techniques for transmitting uplink data in the dual connectivity efficiently can be provided.

BRIEF DESCRIPTION OF DRAWINGS

FIG. 3 is a schematic view for illustrating a radio communication system according to one or more embodiments of the present invention;

FIG. 4 is a block diagram for illustrating an arrangement of user equipment according to one or more embodiments of the present invention;

FIG. 7 illustrates a table representing index values indicative of buffer size levels according to one or more embodiments of the present invention.

EMBODIMENTS OF THE INVENTION

Figure 1:
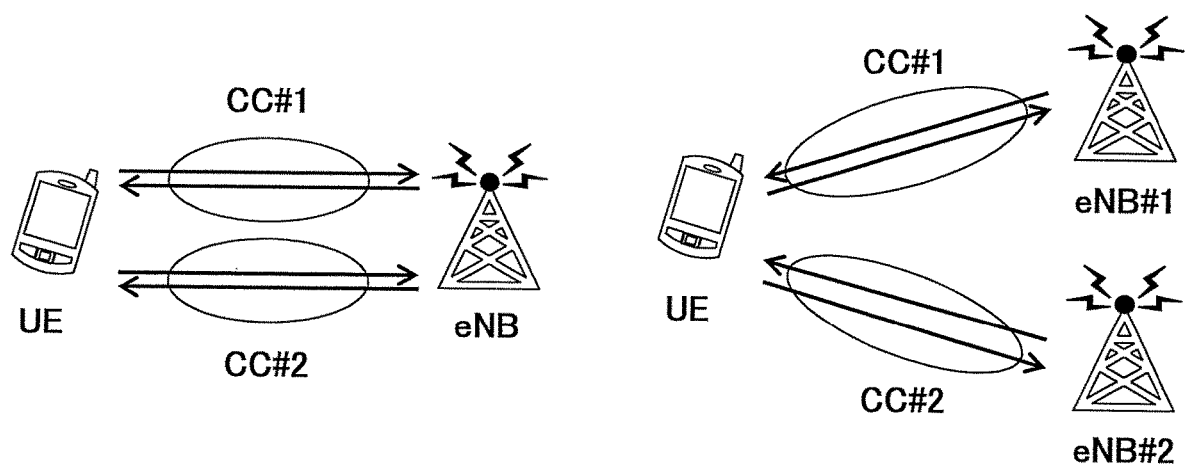
FIG. 1 is a schematic view for illustrating carrier aggregation.
Figure 2:
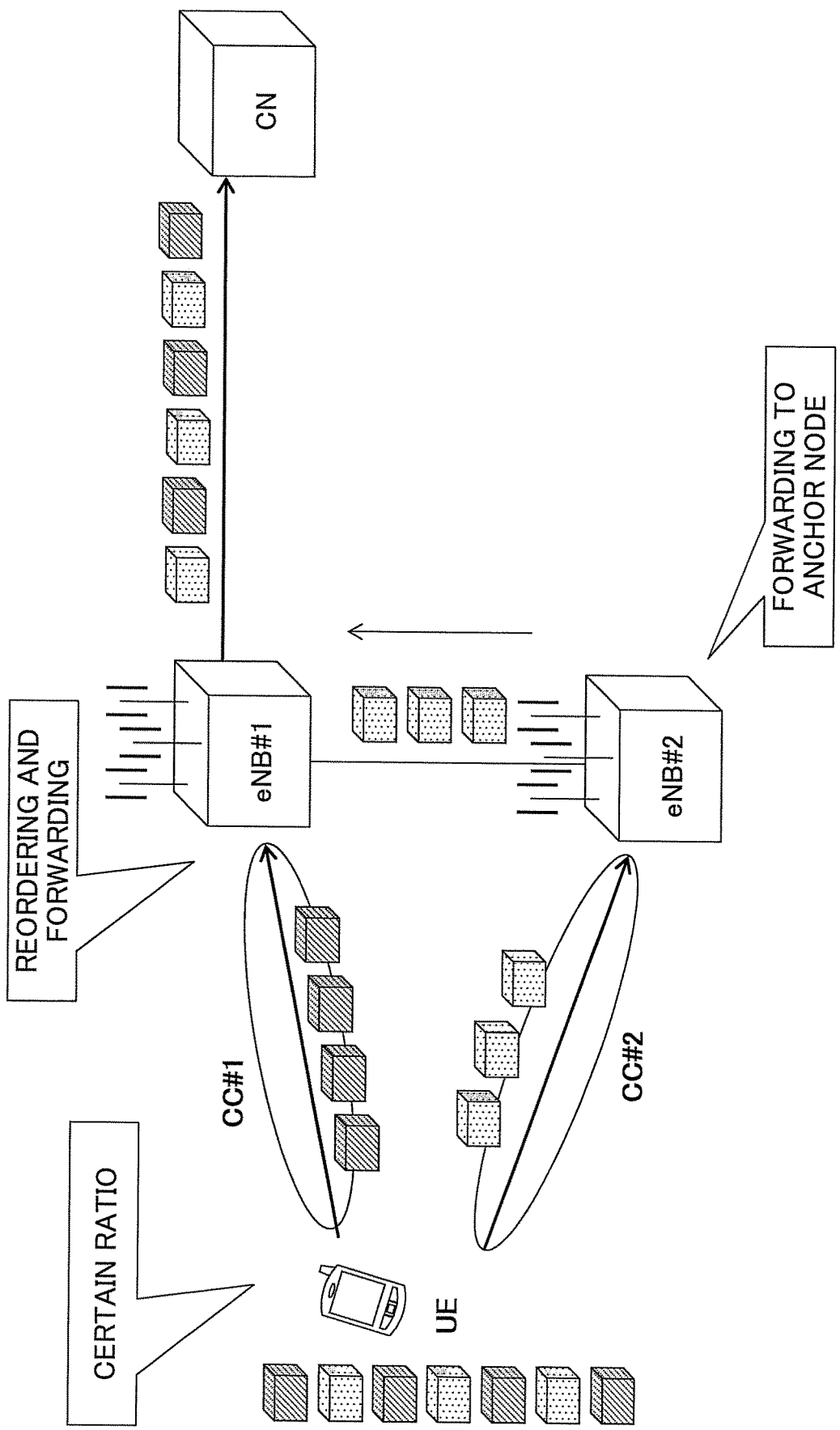
FIG. 2 is a schematic view for illustrating bearer splitting in dual connectivity.

Embodiments of the present invention are described below with reference to the drawings.

User equipment having a dual connectivity function to communicate with multiple base stations simultaneously is disclosed. The user equipment receives splitting trigger information for triggering splitting transmission (bearer splitting) of uplink data to multiple base stations from a master base station. The splitting trigger information indicates a threshold for a data amount stored in a transmission buffer for storing to-be-transmitted uplink data and a base station to transmit the uplink data stored in the transmission buffer when the stored data amount is smaller than or equal to the threshold. The user equipment selects the base station to transmit the uplink data stored in the transmission buffer from the multiple base stations depending on whether the data amount stored in the transmission buffer is smaller than or equal to the threshold.

In one or more embodiments, when the data amount stored in the transmission buffer is smaller than or equal to the threshold, the user equipment transmits the uplink data stored in the transmission buffer to the base station indicated in the splitting trigger information, and otherwise if the data amount stored in the transmission buffer is larger than the threshold, the user equipment transmits an amount of uplink data corresponding to the threshold in the uplink data stored in the transmission buffer to the indicated base station and an amount of uplink data exceeding the threshold to another base station.

In this manner, compared to the method for setting the ratio of distributing the to-be-transmitted packets over multiple base stations in a semi-static manner, it can be expected that uplink throughput is improved by setting the threshold and the indicated base station in the splitting trigger information properly, for example.

A radio communication system according to one or more embodiments of the present invention is described with reference to FIG. 3. FIG. 3 is a schematic view for illustrating a radio communication system according to one or more embodiments of the present invention.

As illustrated in FIG. 3, a radio communication system 10 has user equipment 100 and base stations 200A, 200B. The radio communication system 10 supports dual connectivity where the user equipment 100 uses component carriers CC#1, CC#2 served from the multiple base stations 200A, 200B to conduct simultaneous communication, and as illustrated, the user equipment 100 uses a dual connectivity function to communicate with the master base station (MeNB) 200A and the secondary base station (SeNB) 200B.

The user equipment 100 has the dual connectivity function to communicate with the multiple base stations 200A, 200B simultaneously. Typically, as illustrated, the user equipment 100 may be any appropriate information processing device with a radio communication function such as a smartphone, a mobile phone, a tablet and a mobile router. The user equipment 100 is arranged from a CPU (Central Processing Unit) such as a processor, a memory device such as a RAM (Random Access Memory) and a flash memory, a radio communication device for transmitting and receiving radio signals to/from the base stations 200A, 200B and so on. For example, functions and operations of the user equipment 100 as stated below may be implemented by the CPU running data and programs stored in the memory device. However, the user equipment 100 is not limited to the above-stated hardware configuration and may be arranged from circuits for implementing one or more of operations as stated below.

The base stations 200A, 200B (which may be collectively referred to as the base stations 200 hereinafter) establish a radio connection to the user equipment 100 to transmit downlink (DL) packets received from network devices, such as an upper station and a server, communicatively connected on a core network (not shown) to the user equipment 100 as well as transmit uplink (UL) packets received from the user equipment 100 to the network devices. In the illustrated example, the base station 200A serves as a master base station (MeNB) or a primary base station, and the base station 200B serves as a secondary base station (SeNB). In the dual connectivity, the master base station 200A controls simultaneous communication between the user equipment 100 and the base stations 200A, 200B in accordance with the dual connectivity and controls communication with the upper core network (not shown).

In the dual connectivity, the master base station 200A configures the secondary cell CC#2 served from the secondary base station 200B for the user equipment 100 and forwards uplink data received via the primary cell CC#1 and the secondary cell CC#2 to the core network. Specifically, the user equipment 100 splits the uplink data into two packet sequences in accordance with a predefined splitting manner and transmits the respective split packet sequences to the master base station 200A and the secondary base station 200B via CC#1 and CC#2, respectively. Upon receiving the split packet sequence from the user equipment 100, the secondary base station 200B forwards the received packet sequence to the master base station 200A. Upon receiving the forwarded packet sequence, the master base station 200A reorders the packets received from the secondary base station 200B and the packets received from the user equipment 100 via CC#1 to reconstruct the packet sequence and forwards the reconstructed packet sequence to the core network.

Next, the user equipment according to one or more embodiments of the present invention is described with reference to FIG. 4. FIG. 4 is a block diagram for illustrating an arrangement of the user equipment according to one or more embodiments of the present invention.

As illustrated in FIG. 4, the user equipment 100 has a transmission buffer 110, a buffer status management unit 120 and a transmission control unit 130.

The transmission buffer 110 stores uplink data for transmission. In one or more embodiments, the transmission buffer 110 stores uplink PDCP (Packet Data Convergence Protocol) PDUs (Protocol Data Units). Since sequence numbers (PDCP SNs) are assigned to the respective PDCP PDUs, a packet sequence of the PDCP PDUs can be reordered based on the sequence numbers.

The buffer status management unit 120 manages a data amount stored in the transmission buffer 110. For example, the buffer status management unit 120 determines the number of bytes of data stored in the transmission buffer 110 and indicates the determined number of bytes to the transmission control unit 130. In one or more embodiments, the buffer status management unit 120 may monitor the data amount stored in the transmission buffer 110 and indicate the monitored data amount to the transmission control unit 130 in a periodic manner or in response to occurrence of a predefined indication event. For example, in response to an instruction from the transmission control unit 130, the buffer status management unit 120 may detect the data amount stored in the transmission buffer 110 and indicate the detected data amount to the transmission control unit 130.

The transmission control unit 130 receives splitting trigger information indicative of a threshold for the data amount stored in the transmission buffer 110 and the base station 200A or the base station 200B to transmit the uplink data stored in the transmission buffer 110 when the stored data amount is smaller than or equal to the threshold and select the base station 200A or the base station 200B to transmit the uplink data stored in the transmission buffer 110 depending on whether the data amount stored in the transmission buffer 110 is smaller than or equal to the threshold.

Here, the splitting trigger information indicates information for triggering splitting transmission (bearer splitting) of uplink data to the master base station 200A and the secondary base station 200B. For example, the base station 200 indicated in the splitting trigger information may be the base station 200A or 200B serving a cell expected to achieve a higher throughput or the base station 200A or the base station 200B serving a cell that can stably achieve a throughput higher than or equal to a predetermined level. Also, the threshold may be a data amount for which the throughput higher than or equal to the predetermined level can be ensured by using a cell of the indicated base station 200. Alternatively, the threshold may be a data amount that can be transmitted by using the maximum radio resources at the indicated base station 200 allowed to be scheduled for the user equipment 100. However, the present invention is not limited to it, and the base station and/or the threshold selected in accordance with any appropriate criteria may be used. In one or more embodiments, when the bearer splitting or the splitting transmission is configured in an RRC, the transmission control unit 130 may receive the splitting trigger information from the master base station 200A for dual connectivity.

In one or more embodiments, when the data amount stored in the transmission buffer 110 is smaller than or equal to the threshold, the transmission control unit 130 may transmit the uplink data stored in the transmission buffer 110 to the base station 200A or the base station 200B indicated in the splitting trigger information, and when the data amount stored in the transmission buffer 110 is larger than the threshold, the transmission control unit 130 may transmit the uplink data stored in the transmission buffer 110 to the indicated base stations 200A and 200B. On the other hand, when the data amount stored in the transmission buffer 110 is larger than the threshold, the transmission control unit 130 may transmit an amount of uplink data corresponding to the threshold in the uplink data stored in the transmission buffer 110 to the indicated base station 200A or 200B and an amount of uplink data exceeding the threshold to the other base station 200A or 200B.

Figure 5:
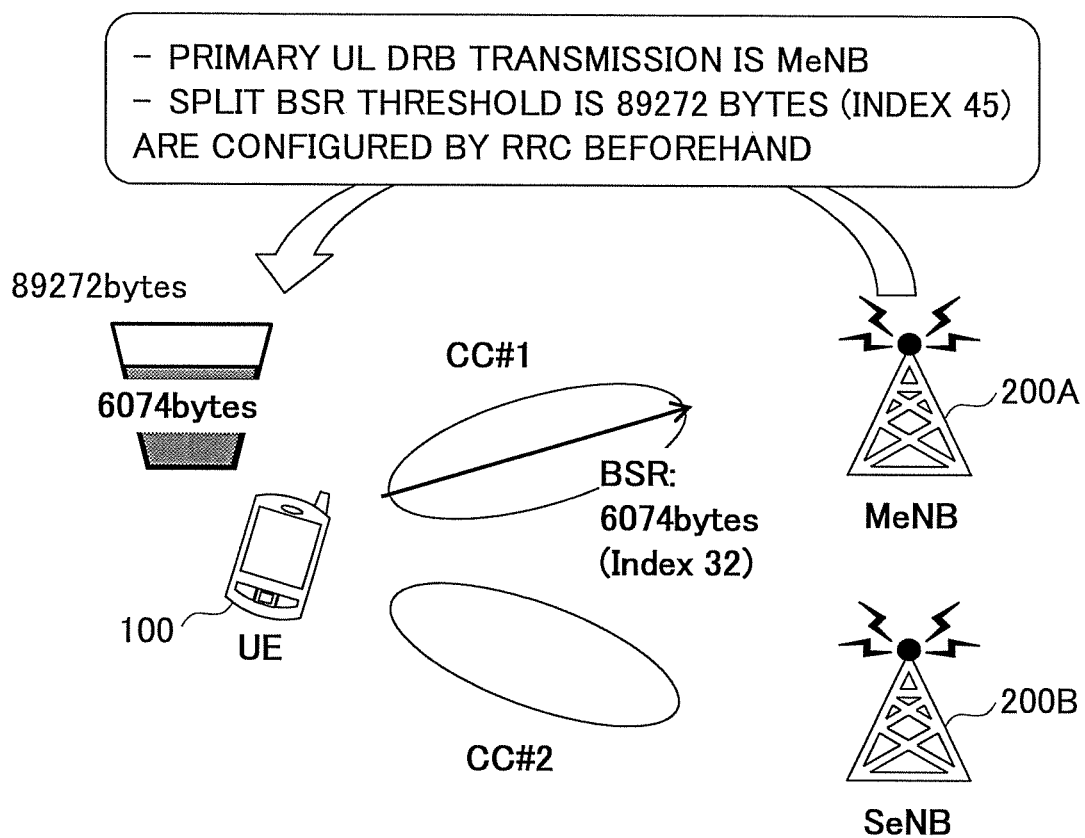
FIG. 5 is a schematic view for illustrating an uplink data transmission operation according to one or more embodiments of the present invention.

As illustrated in FIG. 5, it is assumed that the transmission control unit 130 receives the splitting trigger information from the master base station 200A, and the splitting trigger information indicates 89272 bytes as the threshold and the master base station 200A as the base station to transmit the uplink data stored in the transmission buffer 110 during the data amount stored in the transmission buffer 110 being smaller than or equal to 89272 bytes, for example. In the example as illustrated in FIG. 5, the data amount stored in the transmission buffer 110 is 6074 bytes, which is below the indicated threshold, and the transmission control unit 130 accordingly transmits the stored uplink data only to the master base station 200A via CC#1. In other words, while the stored data amount is smaller than or equal to the threshold, the transmission control unit 130 does not use the secondary base station 200B for transmission of the uplink data. In one or more embodiments, the transmission control unit 130 may indicate the amount of uplink data for transmission to the master base station 200A to request radio resources to transmit the uplink data. For example, the transmission control unit 130 may indicate the amount of uplink data for transmission to the master base station 200A in a BSR (Buffer Status Report). Upon receiving the indication, the master base station 200A schedules radio resources to transmit 6074 bytes of uplink data for the user equipment 100. The transmission control unit 130 uses the scheduled radio resources to transmit the uplink data to the master base station 200A.

Figure 6:
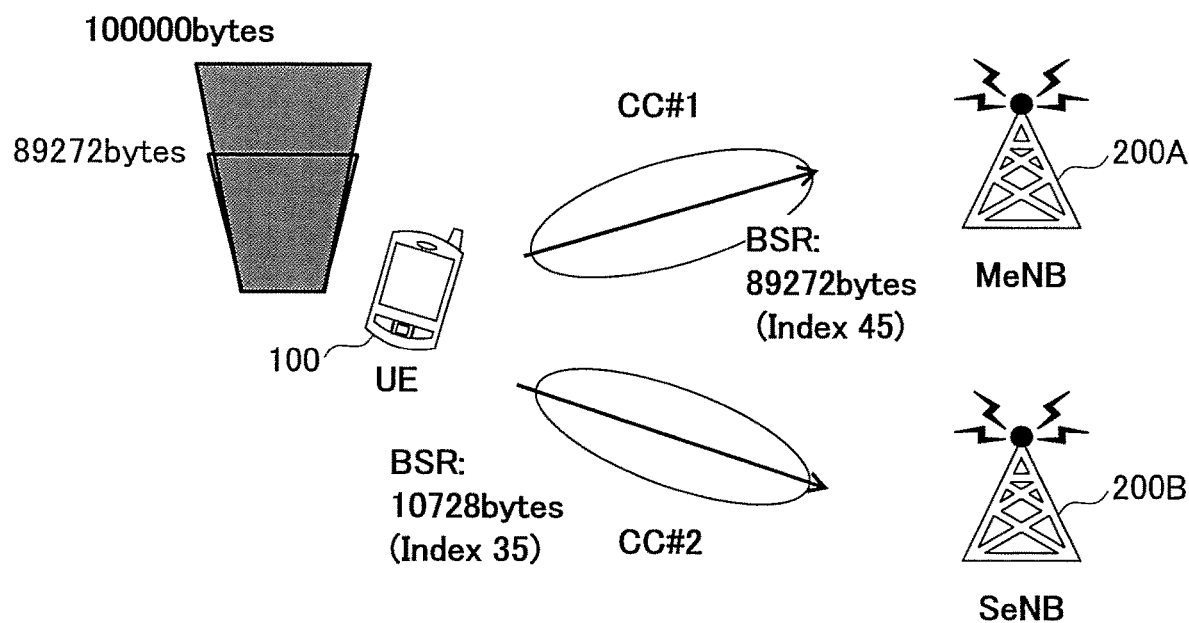
FIG. 6 is a schematic view for illustrating an uplink data transmission operation according to one or more embodiments of the present invention.

As illustrated in the example in FIG. 6, on the other hand, when the data amount stored in the transmission buffer 110 reaches 100000 bytes and exceeds the indicated threshold, the transmission control unit 130 transmits 89272 bytes of uplink data corresponding to the threshold in the stored 100000 bytes of uplink data to the master base station 200A via CC#1 and 10728 bytes (=100000 bytes-89272 bytes) of uplink data exceeding the threshold to the secondary base station 200B via CC#2. In other words, upon the stored data amount exceeding the threshold, the transmission control unit 130 starts to transmit the uplink data to the secondary base station 200B. In one or more embodiments, the transmission control unit 130 may indicate respective data amounts of uplink data for transmission to the master base station 200A and the secondary base station 200B to request radio resources to transmit the uplink data. For example, the transmission control unit 130 may indicate the data amounts of uplink data for transmission to the master base station 200A and the secondary base station 200B in a BSR. Upon receiving the indication, the master base station 200A schedules radio resources to transmit the 89272 bytes of uplink data for the user equipment 100, and the secondary base station 200B schedules radio resources to transmit the 10728 bytes of uplink data for the user equipment 100. The transmission control unit 130 uses the scheduled radio resources to transmit the uplink data to the master base station 200A and the secondary base station 200B. In the example as illustrated in FIGS. 5 and 6, the master base station 200A is indicated in the splitting trigger information, but the present invention is not limited to it. The secondary base station 200B may be indicated.

In one or more embodiments, the transmission control unit 130 may have correspondence information indicative of association of respective ranges of data amounts stored in the transmission buffer 110 with index values representing the respective ranges, and the transmission control unit 130 may receive the splitting trigger information including the threshold indicated by the corresponding index value. Similarly, the transmission control unit 130 may indicate the respective data amounts of uplink data transmitted to the master base station 200A and the secondary base station 200B by the corresponding index values to the master base station 200A and the secondary base station 200B. For example, the correspondence information may be arranged in a table form as illustrated in FIG. 7. According to the correspondence information as illustrated in FIG. 7, the threshold of 89272 bytes in the examples in FIGS. 5 and 6 corresponds to index 45, and the master base station 200A may indicate the threshold by index 45 in the splitting trigger information. Similarly, in the example in FIG. 5, the transmission control unit 130 may indicate the data amount of 6074 bytes transmitted to the master base station 200A by index 32 in a BSR. Also, in the example in FIG. 6, the transmission control unit 130 may indicate the data amount of 89272 bytes transmitted to the master base station 200A by index 45 in the BSR and the data amount of 10728 bytes transmitted to the secondary base station 200B by index 35 in the BSR. In this manner, the representation of data amounts with the indices can indicate the data amounts with a few number of bits compared to the bit representation of the data amounts.

Figure 8:
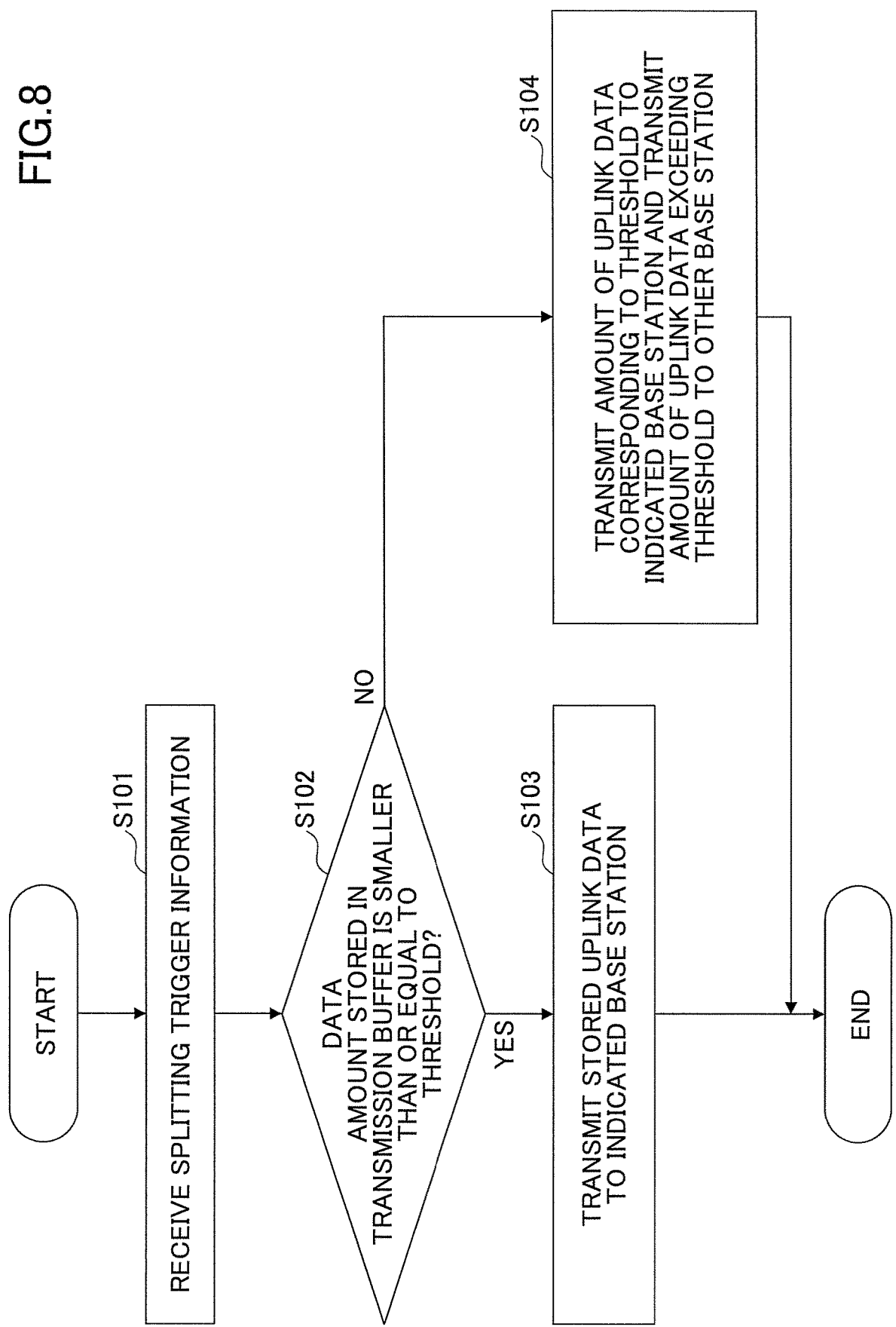
FIG. 8 is a flowchart for illustrating an uplink data transmission operation according to one or more embodiments of the present invention.

Next, an uplink data transmission operation in the user equipment according to one or more embodiments of the present invention is described with reference to FIG. 8. FIG. 8 is a flowchart for illustrating an uplink data transmission operation in the user equipment according to one or more embodiments of the present invention.

As illustrated in FIG. 8, at step S101, the user equipment 100 receives splitting trigger information indicative of a threshold for a data amount stored in the transmission buffer 110 for storing uplink data for transmission and the base station 200A or 200B to transmit the uplink data stored in the transmission buffer 110 when the stored data amount is smaller than or equal to the threshold. In one or more embodiments, when bearer splitting is configured in an RRC, the user equipment 100 may receive the splitting trigger information from the master base station 200A. Also, the user equipment 100 may have correspondence information indicative of respective ranges of data amounts stored in the transmission buffer 110 with index values representing the respective ranges in advance, and the threshold may be indicated by the index value. It is assumed below that the splitting trigger information, but is not limited to it, indicates the master base station 200A.

At step S102, the user equipment 100 determines whether the data amount stored in the transmission buffer 110 is smaller than or equal to the threshold. The user equipment 100 selects the base station 200A or the base station 200B to transmit the uplink data stored in the transmission buffer 110 from the base stations 200A and 200B depending on the determination result at step S102.

If the data amount stored in the transmission buffer 110 is smaller than or equal to the threshold (S102: Yes), the user equipment 100 transmits the uplink data to the master base station 200A indicated in the splitting trigger information. On the other hand, if the data amount stored in the transmission buffer 110 exceeds the threshold (S102: No), the user equipment 100 transmits an amount of uplink data corresponding to the threshold to the master base station 200A indicated in the splitting trigger information and an amount of uplink data exceeding the threshold, that is, the remaining amount of uplink data, to the secondary base station 200B. In one or more embodiments, the user equipment 100 may indicate data amounts of uplink data for transmission to the master base station 200A and/or the secondary base station 200B in a BSR to request radio resources to transmit the uplink data. Also, the data amounts may be indicated by the index values.

Although the embodiments of the present invention have been described in detail, the present invention is not limited to the above-stated specific embodiments, and various modifications and variations can be made within the spirit of the present invention as recited in claims.

This international patent application is based on Japanese Priority Application No. 2014-055169 filed on Mar. 18, 2014, the entire contents of which are hereby incorporated by reference.

LIST OF REFERENCE SYMBOLS

10: radio communication system
100: user equipment
200A, 200B: base station

The invention claimed is:

1. A user equipment having a dual connectivity function to communicate with multiple base stations simultaneously, comprising:

a transmission buffer configured to store uplink data for transmission;

a buffer status management unit configured to manage a data amount stored in the transmission buffer; and a transmission control unit configured to receive splitting trigger information indicative of a threshold for the data amount stored in the transmission buffer and a first base station to transmit the uplink data stored in the transmission buffer when the stored data amount is smaller than or equal to the threshold and select a base station to transmit the uplink data stored in the transmission buffer from the multiple base stations depending on whether the data amount stored in the transmission buffer is smaller than or equal to the threshold, wherein the transmission control unit receives the splitting trigger information including the index value corresponding to the threshold, and wherein the transmission control unit has correspondence information indicative of association of respective ranges of data amounts stored in the transmission buffer with index values representing the respective ranges.

2. The user equipment as claimed in claim 1, wherein when the data amount stored in the transmission buffer is smaller than or equal to the threshold, the transmission control unit transmits the uplink data stored in the transmission buffer to the first base station, and when the data amount stored in the transmission buffer is larger than the threshold, the transmission control unit transmits the uplink data stored in the transmission buffer to the first base station and a second base station in the multiple base stations.

3. The user equipment as claimed in claim 2, wherein when the data amount stored in the transmission buffer is larger than the threshold, the transmission control unit transmits an amount of uplink data corresponding to the threshold in the uplink data stored in the transmission buffer to the first base station and an amount of uplink data exceeding the threshold to the second base station.

4. The user equipment as claimed in claim 2, wherein when bearer splitting is configured in an RRC (Radio Resource Control), the transmission control unit receives the splitting trigger information from a master base station for dual connectivity.

5. The user equipment as claimed in claim 3, wherein the transmission control unit indicates respective data amounts of uplink data for transmission to the first base station and second base station to request radio resources to transmit the uplink data.

6. The user equipment as claimed in claim 3, wherein when bearer splitting is configured in an RRC (Radio Resource Control), the transmission control unit receives the splitting trigger information from a master base station for dual connectivity.

7. The user equipment as claimed in claim 5, wherein when bearer splitting is configured in an RRC (Radio Resource Control), the transmission control unit receives the splitting trigger information from a master base station for dual connectivity.

8. The user equipment as claimed in claim 1, wherein the transmission control unit indicates the transmitted data amounts of uplink data to the multiple base stations with the corresponding index values.

9. The user equipment as claimed in claim 8, wherein the transmission control unit indicates the index values to the first base station and the second base station in a BSR (Buffer Status Report).

10. The user equipment as claimed in claim 8, wherein when bearer splitting is configured in an RRC (Radio Resource Control), the transmission control unit receives the splitting trigger information from a master base station for dual connectivity.

11. The user equipment as claimed in claim 9, wherein when bearer splitting is configured in an RRC (Radio Resource Control), the transmission control unit receives the splitting trigger information from a master base station for dual connectivity.

12. The user equipment as claimed in claim 1, wherein when bearer splitting is configured in an RRC (Radio Resource Control), the transmission control unit receives the splitting trigger information from a master base station for dual connectivity.

13. The user equipment as claimed in claim 1, wherein the index values representing the respective ranges are indicative of uplink data storage levels of the transmission buffer.

14. An uplink data transmission method for use in user equipment having a dual connectivity function to communicate with multiple base stations simultaneously, the method comprising:
receiving splitting trigger information indicative of a threshold for a data amount stored in a transmission buffer for storing uplink data for transmission and a first base station to transmit the uplink data stored in the transmission buffer when the stored data amount is smaller than or equal to the threshold;
determining whether the data amount stored in the transmission buffer is smaller than or equal to the threshold;
selecting a base station to transmit the uplink data stored in the transmission buffer from the multiple base stations depending on a result of the determination; and
transmitting the uplink data to the selected base station,
wherein the receiving receives the splitting trigger information including the index value corresponding to the threshold, and
wherein the transmission control unit has correspondence information indicative of association of respective ranges of data amounts stored in the transmission buffer with index values representing the respective ranges.

* * * * *